United States Patent [19]
Getenby

[11] Patent Number: 5,357,792
[45] Date of Patent: Oct. 25, 1994

[54] ADAPTOR FOR TESTING FUEL PRESSURE IN AN OPERATING ENGINE

[76] Inventor: Alan D. Getenby, 542 S. 560 E., Orem, Utah 84058

[21] Appl. No.: 1,858

[22] Filed: Jan. 8, 1993

[51] Int. Cl.⁵ .................... F02M 65/00; G01M 15/00
[52] U.S. Cl. ................................ 73/119 A; 73/756
[58] Field of Search ............................ 73/119 A, 756

[56] References Cited
U.S. PATENT DOCUMENTS

| | | | |
|---|---|---|---|
| 3,650,155 | 3/1972 | McJones | 73/756 X |
| 4,599,903 | 7/1986 | Ferris | 73/756 |
| 5,117,683 | 6/1992 | Phillips | 73/119 A |
| 5,183,078 | 2/1993 | Sorrell | 73/756 X |

Primary Examiner—Richard E. Chilcot, Jr.
Assistant Examiner—Joseph L. Felber
Attorney, Agent, or Firm—Delbert R. Phillips

[57] ABSTRACT

An adaptor is provided for use in a fuel line. The adaptor has an attachment means for securing a flexible hose or tubing with a standard fuel pressure gauge to the fuel line for measuring the pressure in the fuel line. The adaptor allows the fuel pressure to be measured while an automobile is being tested on a machine, such as a dynamometer, or on the open road. The adaptor can be substituted into the fuel line in place of the fuel filter, that is normally present in the fuel line to filter the fuel before it reaches a fuel injector.

16 Claims, 2 Drawing Sheets

ADAPTOR FOR TESTING FUEL PRESSURE IN AN OPERATING ENGINE

BACKGROUND OF THE INVENTION

1. Field of the Invention

An adaptor is described for replacing the filter in a fuel line. The adaptor has a quick release and attachment means for a pressure gauge. This adapter simplifies and expedites troubleshooting, particularly in vehicles that are equipped with throttle body fuel injection systems.

2. Description of the Prior Art

In the early 1980's about 6% of the cars manufactured in the United States were equipped with fuel injection systems. By 1989 about 96% of the cars manufactured in the United States were equipped with some type of fuel injection system. These systems are divided into two popular types; one is called port injection and the other is called central point or throttle body injection (TBI).

In port fuel injection systems the fuel is injected directly into the intake manifold near the cylinder intake valves where the fuel is mixed with air. The system usually has a provision whereby a pressure gauge can be attached to the fuel lines to measure the pressure.

In the TBI injection systems the fuel is injected into a central chamber where the fuel is mixed with air. The fuel air mixture is then drawn into the cylinder through the intake manifold, as was done previously using a carburetor. Most TBI fuel injection systems do not have a provision for attaching a gauge to the fuel lines for pressure measurement. The majority of the automobiles manufactured by General Motors (GM), for example, have the TBI type of injection which, at this point in time, numbers about 20 million automobiles.

One persistent problem with the GM TBI is the occasional sluggishness and delayed reaction felt when the engine is accelerating under load. This common symptom results from a loss of fuel pressure, which would be indicative of a need for replacing the fuel pump, replacing a bad or clogged fuel filter, or that a tune up is necessary. The current procedures for checking the fuel pressure in the TBI systems are cumbersome and time consuming. Checking the fuel pump on GM TBI fuel systems, for example, is imprecise in determining the cause for sluggishness and delayed acceleration. The steps currently in use to test these fuel systems are:

1. Remove the fuel pump fuse from the fuse block and crank engine.
2. Run the engine until it stalls when the fuel in the system runs out.
3. When the engine dies, crank the engine for approximately 3 seconds to insure that all the fuel is evacuated from the fuel lines.
4. Turn the ignition off and reinstall the fuel pump fuse.
5. Remove the air cleaner and plug the thermostatic air cleaner vacuum port on the throttle body unit.
6. Remove the steel fuel line between the throttle body and the fuel inlet line.
7. Install a fuel pressure gauge between the throttle body unit and the fuel inlet line.
8. Start the engine and observe the fuel pressure reading.
9. De-pressurize the fuel system as described in steps 1–4.
10. Remove the fuel pressure gauge and re-install the steel line to the throttle body.
11. Start the car and watch for fuel leaks.
12. Remove the plug from the throttle body vacuum port and re-install the air cleaner.

This whole procedure requires at least 40 minutes to perform. Fuel pressure readings cannot be taken when the engine is accelerating under load such as under normal driving conditions or on a dynamometer.

There are many pressure testing devices described in the literature and on the market. U.S. Pat. No. 2,566,742 issued 1 Sep. 1951 to C. A. Odell, describes a device for measuring the amount of fuel used and the pressure of the fuel. The gauge is an intricate part of the testing apparatus and cannot be detached for other types of pressure testing. U.S. Pat. No. 4,534,224 issued 13 Aug. 1985 to S. G. Raftis, describes a fuel pressure testing device wherein the gauge is connected to the fuel system through a diaphragm which prevents the pressurized fluid from coming into contact with the tubing of the pressure gauge. The gauge is fixed to the unit. U.S. Pat. No. 3,869,905 issued 11 Mar. 1975 to M. T. Allen, provides a method for testing oil pressure in a gasoline or diesel engine. This unit is used to isolate the oil pump assembly from the engine's lubricating system to determine which of the two systems is responsible for an oil pressure problem. U.S. Pat. No. 2,351,027 issued 13 Jun. 1944 to W. M. Ewart et al, describes a device for measuring the fuel flow in a carburetted engine system. U.S. Pat. No. 3,292,428 issued 20 Dec. 1966 to D. M. Motl, describes a device to test the pressure of a fuel pump. U.S. Pat. No. 2,333,252 issued 2 Nov. 1943 to B. M. Ikert, is drawn to a fuel line testing device that measures both fuel flow and fuel pressure. U.S. Pat. No. 2,803,961 issued 27 Aug. 1957 to J. Z. Harmon, describes a device for testing and clearing oil lines. This device has a gauge that is attached to a cylinder through an opening. These and other testing units, such as U.S. Pat. No. 2,859,612 issued 11 Nov. 1958 to H. H. Morse, do not have the flexible connection to the gauge nor do they have any indication that they can be substituted for the fuel filter in a TBI fuel system. None of the above references teach the replacement of the fuel filter, in a fuel line, with an adaptor device to which a standard fuel pressure gauge can be attached by a flexible tubing, to measure the pressure of the fuel within the line.

It is the object of this invention to provide an adaptor that can be used to measure the fuel pressure in a fuel injected automobile engine. The adaptor can be placed in the fuel line or substituted for the fuel filter normally provided in the fuel inlet to filter the fuel line before it reaches the injector.

It is a further object of this invention to provide a means for measuring the fuel pressure in a fuel injected engine by providing an adapter that can be inserted in place of the fuel filter in the pressurized line.

It is a yet further object of this invention to provide an adapter that is placed in the pressurized line of a fuel injected engine that will measure the fuel pressure while the engine is under load.

A still further object of this invention is to provide a means for quickly testing the pressure of a pressurized fuel line that has no provisions for checking the pressure.

SUMMARY OF THE INVENTION

The present invention includes an adaptor that provides a means whereby a pressure gauge provided with a flexible tubing can be connected to a pressurized fuel line with no other provisions for attaching a fuel pressure gauge being necessary. This allows the gauge to be read while the automobile is being tested on a machine such as a dynamometer or while on the open road.

The adaptor described herein facilitates a quick and accurate measurement of the fuel pressure in fuel injected automobile engines without the need for providing a permanent means for attaching a pressure gauge. The adaptor described herein can be used, for example, on most General Motors Automobiles built from the early 1980's up to the present, that are provided with the TBI system. However, the design can easily be modified to accommodate and be compatible with other types of fuel injection systems used by other automobile manufacturers. Depending upon the type of fuel line connectors, a modified adaptor can also be manufactured for use with either the central point or port injection systems that do not have provisions made for attaching pressure gauges to the fuel systems.

In its preferred form, the adaptor is substituted for the fuel filter in the fuel line of the fuel system during the testing procedure. This permits a standard fuel pressure gauge to be used instead of the special machined testers now required. The time required for testing a fuel stem with the herein described adaptor is reduced from 40 minutes or more to just about 8 minutes with the additional advantage that the car may be road tested with the pressure gauge installed to give accurate test results under any kind of road condition.

DESCRIPTION OF THE PREFERRED EMBODIMENT

The adaptor of the present invention consists of an elongated rigid cylinder having a means at either end for attaching the adaptor into a fuel line, and in particular in a fuel line where the fuel filter is normally installed. To prevent leakage, sealing means are provided with the attaching means. The seal is preferably formed as the adaptor is attached to the fuel line by thread means compatible with those normally provided for attaching the fuel filter into the fuel line. A passage is provided in the side of the elongated cylinder to join the conduit extending through the elongated cylinder, and communicate any fuel under pressure within the substantially unobstructed conduit, with the side of the elongated cylinder. The passage is fitted with a valve that normally prevents fuel from passing through the passage. A pressure testing means is provided consisting of a pressure gauge, a flexible hose or tube and a hose or tube attaching means. The valve is enclosed within a housing. The housing is designed to provide a means for connecting the hose attaching means to the adaptor. The hose attaching means is designed such that when it is attached to the valve housing, the valve is forced open to provide a direct communication between the adaptor conduit and the pressure gauge.

Figure 1:
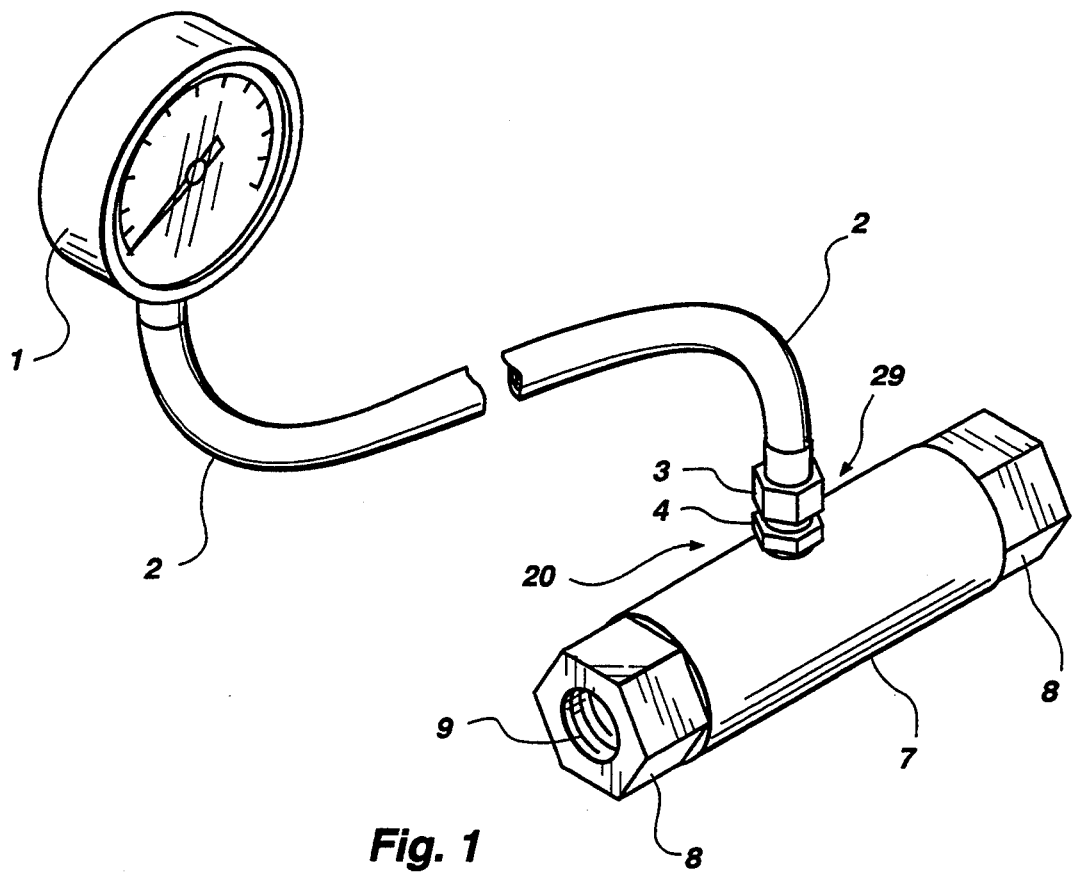
FIG. 1 is a perspective view of the adaptor used for measuring the pressure in the fuel line with the fuel pressure gauge attached.

FIG. 1 shows a pressure gauge 1 attached by a flexible hose or tube 2 to an adaptor 20 by a connector means 8. The connector means 8 includes a threaded hose attachment means 3 and a Schrader valve housing 4. The Schrader valve housing 4 can be removably or permanently attached to the adaptor 20. The adaptor is shown as a rigid elongated cylinder 7 that has multifaceted end sections 8, for use with a wrench, and internal threads 9, for attachment to threaded connector means often provided on fuel lines.

Figure 2:
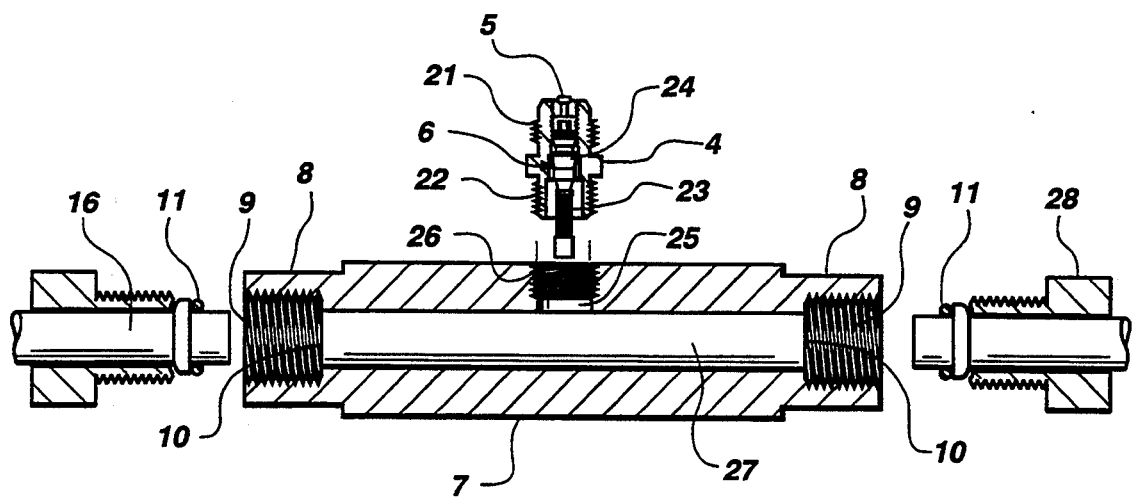
FIG. 2 is a vertical sectional view of the adaptor with the Schrader valve shown slightly removed.

FIG. 2 shows a cross section of the adaptor 20 rigid elongated cylinder 7 and Schrader valve 6 and Schrader valve housing 4. The Schrader valve 6 shown is typical of this type valve, having a spring 23 that presses the valve against a valve seat 24, and a needle type pressure release 5, that opens the valve when it is pressed inwardly. The Schrader valve housing is provided in its central area with flattened extensions, for use with a wrench, and first thread means 22, for attaching the housing to the adaptor 20 passage 25 by means of thread means 26 in the adaptor at the passage, and second thread means 21, for attaching the housing to the hose attachment means 3. As is standard operating provisions for this type valve, the hose attachment means 3 is provided with means to depress the pressure release means 5 of the Schrader valve. The elongated cylinder 7 is provided with a conduit 27 that extends the entire length of the elongated cylinder. At either end of the elongated cylinder, thread means 9 are provided for attaching the fuel lines to the adaptor. At the base of the thread means 9, an O-Ring seat 10 is provided. The seat provides an area against which an O-Ring 11, provided around a fuel line 16, can be pressed when the fuel line is attached to the adaptor. When the fuel line attachment means 28 is screwed into the thread means 9 of the adaptor, the O-Ring 11 is pressed against the O-Ring seat 10 to seal and prevent the escape of fuel.

Figure 3:
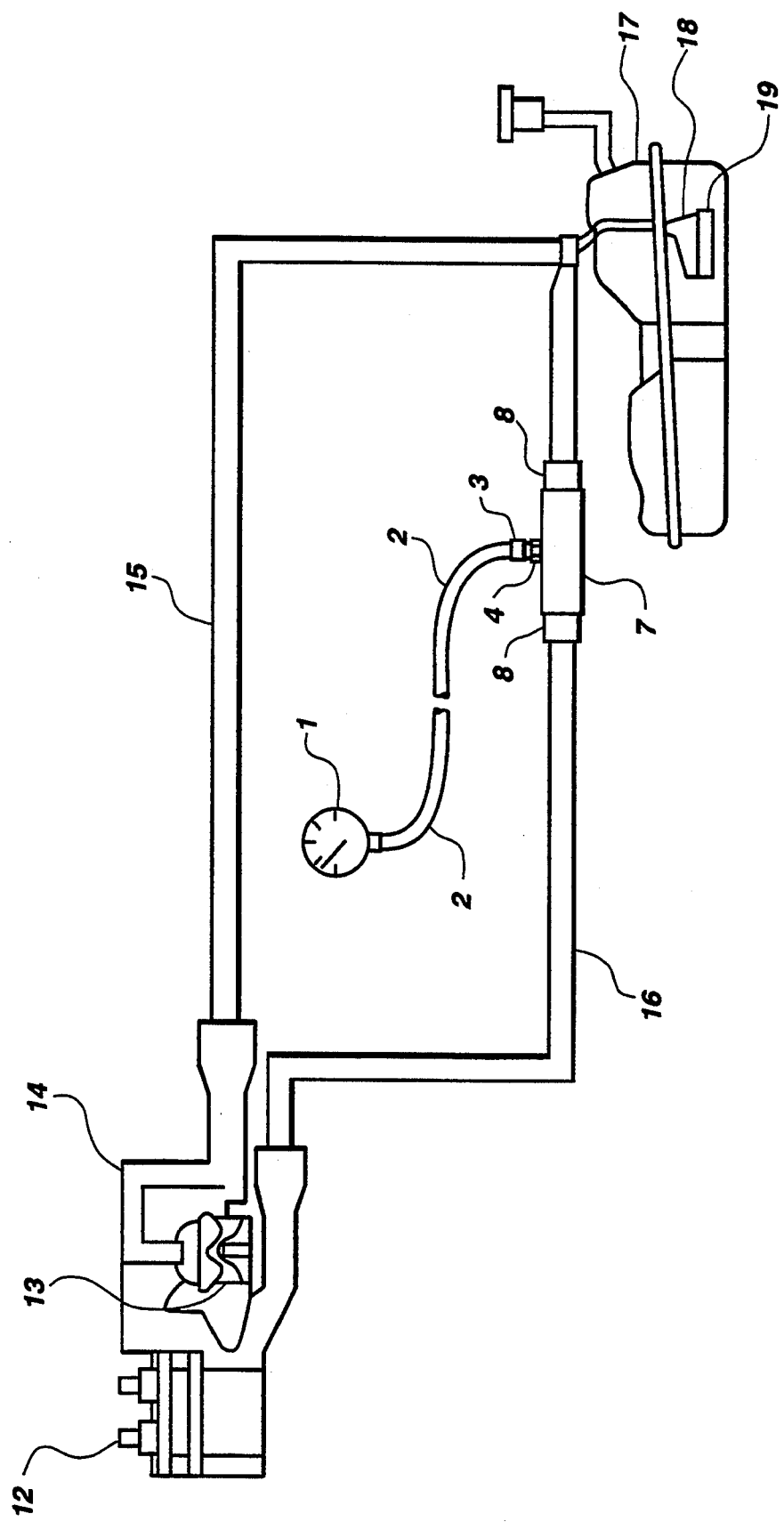
FIG. 3 is a schematic diagram of a fuel system with the pressure adaptor and pressure gauge replacing the standard fuel filter.

FIG. 3 represents a typical TBI fuel system with the elongated cylinder 7 of the adaptor shown substituted into the fuel line 16 at the position the fuel filter normally occupies. The pressure gauge 1 is at the end of a flexible hose or tube 2 that is attached to the adaptor by connector means 8 by having the threads of the hose attachment means 3 screwed onto the threads provided on the Schrader valve housing 4. The fuel supply is depicted as a pump 18 that takes suction through a sock separator 19 for discharge through a pressure regulator 13 to a fuel injector 12 in the throttle body 14. A fuel return line 15 passes excess fuel back into the fuel tank 17.

The rigid elongated cylinder 7 can be formed in any convenient shape and made form any of the materials that resist damage by fuels, such as steel, brass, aluminum, glass, plastic, etc. The flexible tubing used to attach the gauge to the adaptor 20 can be formed from a rubber, such as Neoprene, plastic or other synthetic material that is flexible and resistant to damage from fuels.

The connections can be made with different fastening means than those shown. For example, the male and female sections shown can be reversed or clamp means can be used with rigid tubes for securing flexible fuel hoses onto the rigid elongated cylinder 7, rather than the wrench operated thread means shown.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims:

I claim:

1. An adaptor for measuring the pressure in a fuel line of a fuel injection system which replaces a fuel filter comprising:
    said adaptor being sized and shaped to be inserted into said fuel line to replace said fuel filter whereby fuel flows continuously from a fuel tank to an operating engine;
    said adapter including a rigid elongated fuel conducting means;
    a substantially unobstructed conduit extending through said adapter;
    attachment means at either end of said rigid elongated fuel conducting means for attaching said adapter into said fuel line in place of said fuel filter;
    sealing means associated with said attachment means to prevent fuel leakage when said adapter is connected into said fuel line;
    a passage extending from said conduit through a side of said rigid elongated fuel conducting means of said adapter;
    said passage having a valve means therein to prevent the escape of fuel and;
    means adjacent said passage to permit attachment of a pressure gauge means to said passage.

2. An adaptor for measuring the pressure in a fuel line as described in claim 1 wherein:
    said means to permit attachment of a pressure gauge includes a quick attachment and release means.

3. An adaptor for measuring the pressure in a fuel line as described in claim 2 wherein:
    said valve means is a Schrader valve.

4. An adaptor for measuring the pressure in a fuel line as described in claim 1 wherein:
    said attachment means at either end of said elongated fuel conducting means are threaded connector means.

5. An adaptor for measuring the pressure in a fuel line as described in claim 1 wherein:
    said attachment means at either end of said elongated fuel conducting means are elongated tube means for receiving thereover flexible tube fuel lines.

6. An adaptor for measuring the pressure in a fuel line as described in claim 1 including:
    a pressure gauge having a connector means;
    said pressure gauge connector means attaching said pressure gauge to said passage.

7. An adaptor for measuring the pressure in a fuel line as described in claim 6 wherein:
    said pressure gauge connector means is formed to open said valve means when said connector means is attached to said passage.

8. An adaptor for measuring the pressure in a fuel line as described in claim 7 wherein:
    a flexible hose extends between said pressure gauge connector means and said pressure gauge.

9. An adaptor for measuring the pressure in a fuel line as described in claim 3 including:
    pressure gauge for measuring fuel pressure;
    a flexible hose attached to said pressure gauge;
    a pressure gauge connector means attaching said flexible hose to said passage;
    said pressure gauge connector means formed to open said Schrader valve when said connector means is attached to said passage.

10. An adaptor for measuring the pressure in a fuel line as described in claim 9 wherein:
    said attachment means at either end of said elongated fuel conducting means are threaded connector means.

11. An adaptor for measuring the pressure in a fuel line as described in claim 9 wherein:
    said adaptor, at said passage extending from said conduit through a side of said adapter, is provided with thread means;
    said Schrader valve is enclosed within a housing means;
    said housing means has a first thread means and a second thread means;
    said first thread means of said housing means engages said thread means at said passage of said adaptor;
    said second thread means of said housing means engages said pressure gauge connector means to attach said pressure gauge to said passage.

12. A process for testing the pressure in a fuel line of a fuel injection system in an operating engine including:
    removing a fuel filter from said fuel line prior to starting the engine;
    replacing said fuel filter with an adapter means while the engine is shut down;
    providing attachment means for connecting said adaptor means within said fuel line;
    providing a side passage in said adaptor means, and a valve in said passage to prevent the escape of fuel;
    securing said adaptor means prior to starting the engine to said fuel lines so as to preclude fuel leakage; and
    starting said engine.

13. A process for testing the pressure in a fuel line as described in claim 12 including:
    connecting a pressure gauge to said passage;
    bringing said fuel within said fuel line up to operating pressure;
    reading said fuel line pressure as shown by said pressure gauge.

14. A process for testing the pressure in a fuel line as described in claim 13 including:
    driving the vehicle in which said adapter has been installed to check the fuel line pressures under various road loads and operating conditions.

15. A process for testing the pressure in a fuel line as described in claim 13 including:
    running the engine under various simulated load conditions;
    reading said fuel line pressures under said various load conditions.

16. A process for testing the pressure in a fuel line as described in claim 13 including after the engine has stopped:
    removing said adaptor means from said fuel line;
    replacing said adaptor means with said fuel filter.

* * * * *

UNITED STATES PATENT AND TRADEMARK OFFICE
CERTIFICATE OF CORRECTION

PATENT NO.   : 5,357,792
DATED        : October 25, 1994
INVENTOR(S)  : Alan D. Gatenby It is certified that error appears in the above-indentified patent and that said Letters Patent is hereby corrected as shown below:

On the title page Inventor should read

--(76) Inventor: Alan D. Gatenby--.

Signed and Sealed this

Third Day of January, 1995

Attest:

BRUCE LEHMAN

Attesting Officer

Commissioner of Patents and Trademarks